(12) United States Patent
Huang et al.

(10) Patent No.: US 10,530,044 B2
(45) Date of Patent: Jan. 7, 2020

(54) MOBILE DEVICE AND ANTENNA STRUCTURE THEREOF

(71) Applicant: Acer Incorporated, New Taipei (TW)

(72) Inventors: Shih-Ting Huang, New Taipei (TW);
Ching-Chi Lin, New Taipei (TW);
Chuan-Chun Wang, New Taipei (TW);
Ming-Ching Yen, New Taipei (TW)

(73) Assignee: Acer Incorporated, New Taipei (TW)

( * ) Notice: Subject to any disclaimer, the term of this patent is extended or adjusted under 35 U.S.C. 154(b) by 25 days.

(21) Appl. No.: 16/041,845

(22) Filed: Jul. 23, 2018

(65) Prior Publication Data
US 2019/0363425 A1    Nov. 28, 2019

(30) Foreign Application Priority Data
May 22, 2018 (TW) ............... 107117421 A (51) Int. Cl.
| | |
|---|---|
| *H01Q 1/24* | (2006.01) |
| *H01Q 1/36* | (2006.01) |
| *H01Q 5/10* | (2015.01) |
| *H01Q 1/52* | (2006.01) |
| *G06F 1/16* | (2006.01) |
| *H01Q 5/357* | (2015.01) |
| *H01Q 5/378* | (2015.01) |
| *H01Q 9/42* | (2006.01) |
| *H01Q 5/328* | (2015.01) |

(52) U.S. Cl.
CPC ........... *H01Q 1/243* (2013.01); *G06F 1/1616* (2013.01); *H01Q 1/36* (2013.01); *H01Q 1/52* (2013.01); *H01Q 5/10* (2015.01); *H01Q 5/328* (2015.01); *H01Q 5/357* (2015.01); *H01Q 5/378* (2015.01); *H01Q 9/42* (2013.01)

(58) Field of Classification Search
CPC  H01Q 1/243; H01Q 1/24; H01Q 1/52; H01Q 5/357; H01Q 5/328; H01Q 1/36; H01Q 9/42; H01Q 5/378; H01Q 5/10; G06F 1/1616
See application file for complete search history.

(56) References Cited

U.S. PATENT DOCUMENTS

| | | | |
|---|---|---|---|
| 2009/0027275 A1* | 1/2009 | Su | H01Q 1/242 343/700 MS |
| 2014/0361941 A1 | 12/2014 | Jenwatanavet et al. | |
| 2016/0028150 A1* | 1/2016 | Chou | H01Q 1/243 343/702 |
| 2016/0087343 A1* | 3/2016 | Chang | H01Q 1/245 343/720 |

(Continued)

FOREIGN PATENT DOCUMENTS

| | | |
|---|---|---|
| CN | 204271247 | 4/2015 |
| TW | I330908 | 9/2010 |
| TW | I549358 | 9/2016 |

*Primary Examiner* — Hai V Tran
(74) *Attorney, Agent, or Firm* — JCIPRNET (57) ABSTRACT

A mobile device and antenna structure thereof are provided. An antenna structure is placed next to a pivot structure of the mobile device and a parasitic element is placed next to a high-frequency radiation element extending from a feeding element, so as to resonate with the high-frequency radiation element to generate a resonant mode for compensating the lack of a high-frequency bandwidth.

12 Claims, 4 Drawing Sheets

(56) References Cited

U.S. PATENT DOCUMENTS

| | | | |
|---|---|---|---|
| 2016/0190699 A1* | 6/2016 | Yang | H01Q 1/38 |
| | | | 343/700 MS |
| 2016/0308281 A1* | 10/2016 | Chang | H01Q 1/243 |
| 2017/0033467 A1* | 2/2017 | Huang | H01Q 13/106 |
| 2017/0264002 A1* | 9/2017 | Yen | H01Q 1/243 |
| 2018/0131075 A1* | 5/2018 | Huang | H01Q 7/00 |

* cited by examiner

MOBILE DEVICE AND ANTENNA STRUCTURE THEREOF

CROSS-REFERENCE TO RELATED APPLICATION

This application claims the priority benefit of Taiwan application serial no. 107117421, filed on May 22, 2018. The entirety of the above-mentioned patent application is hereby incorporated by reference herein and made a part of this specification.

BACKGROUND

Technical Field

The disclosure relates to an electronic device, and particularly relates to a mobile device and an antenna structure thereof.

Description of Related Art

Since a metal casing has advantages of high strength, good heat dissipation effect and increased appearance design, more and more mobile devices (for example, flat panel computers, notebooks, mobile phones) adopt the casing made of a metal material. However, a metal environment formed by the casing of the mobile device usually affects performance of an antenna element. For example, a coupling effect between the metal casing and the antenna element of the mobile device may form an equivalent capacitance, and the formed equivalent capacitance generally results in reduction of radiation efficiency of antenna, and accordingly decreases wireless communication quality of the mobile device. Moreover, the more and more popular slim border design in recent years also greatly limits an application range of the antenna. Regarding the existing all-metal back cover antenna design on the market, in order to maintain antenna irradiation efficiency, the appearance of the product is generally destructed to allow the antenna to have a sufficient clearance area for radiation. However, such manner probably destructs deign aesthetics of the product.

SUMMARY

The disclosure is directed to a mobile device and an antenna structure thereof, in which an antenna still has good antenna efficiency without destructing an appearance of the mobile device.

The disclosure provides a mobile device including a first body, a second body, a pivot structure and an antenna structure. The first body and the second body are rotated relative to each other through the pivot structure. The antenna structure is disposed in the first body. The antenna structure includes a planar inverted F antenna and a first parasitic element. The planar inverted F antenna includes a first radiation element, a second radiation element, a feeding element, a ground element and a third radiation element. The second radiation element and the first radiation element extend toward opposite directions. One end of the feeding element is coupled to a junction of the first radiation element and the second radiation element, and another end of the feeding element has a feeding point, where the feeding point is configured to receive a feeding signal. The feeding element is operated in a first frequency band through a first resonance path extending from the feeding point to an open end of the first radiation element, and is operated in a second frequency band through a second resonance path extending from the feeding point to an open end of the second radiation element. The ground element is connected to the first radiation element and a ground plane. One end of the third radiation element is connected to the ground element, and another end thereof is an open end, and the third radiation element and the first radiation element are disposed in parallel to provide a third resonance path operated in a first sub-frequency band. One end of the first parasitic element is connected to the ground plane, and another end thereof is an open end, and the first parasitic element and the third radiation element are spaced by a coupling spacing to provide a fourth resonance path operated in a second sub-frequency band.

In an embodiment of the disclosure, the antenna structure further includes a second parasitic element, where one end of the second parasitic element is coupled to the ground plane, and another end thereof is an open end, and the open end of the second parasitic element is located adjacent to the open end of the first radiation element to provide a fifth resonance path operated in a third sub-frequency band.

In an embodiment of the disclosure, a length of the fifth resonance path is between a ⅓ wavelength to a ⅕ wavelength of the lowest frequency of the third sub-frequency band.

In an embodiment of the disclosure, a length of the first resonance path is an integer multiple of a ¼ wavelength of the lowest frequency of the first frequency band, a length of the second resonance path is an integer multiple of a ¼ wavelength of the lowest frequency of the second frequency band, a length of the third resonance path is an integer multiple of a ¼ wavelength of the lowest frequency of the first sub-frequency band, and a length of the fourth resonance path is an integer multiple of a ¼ wavelength of the lowest frequency of the second sub-frequency band.

In an embodiment of the disclosure, the ground plane includes the pivot structure.

In an embodiment of the disclosure, the pivot structure includes a metal stand and a metal rotation shaft. The metal stand is fixed to the first body, and is connected to the antenna structure. The metal rotation shaft is connected to the metal stand, and the first body is rotated relative to the second body through rotation of the metal stand relative to the metal rotation shaft.

In an embodiment of the disclosure, the first body includes a metal casing, a carrying element and a plastic border. The antenna structure is formed on the carrying element, and the metal casing and the plastic border are stacked on each other to form the first body.

The disclosure provides an antenna structure including a planar inverted F antenna and a first parasitic element. The planar inverted F antenna includes a first radiation element, a second radiation element, a feeding element, a ground element and a third radiation element. The second radiation element and the first radiation element extend toward opposite directions. One end of the feeding element is coupled to a junction of the first radiation element and the second radiation element, and another end of the feeding element has a feeding point, where the feeding point is configured to receive a feeding signal. The feeding element is operated in a first frequency band through a first resonance path extending from the feeding point to an open end of the first radiation element, and is operated in a second frequency band through a second resonance path extending from the feeding point to an open end of the second radiation element. The ground element is connected to the first radiation element and a ground plane. One end of the third radiation element is connected to the ground element, and another end thereof is an open end, and the third radiation element and the first radiation element are disposed in parallel to provide a third resonance path operated in a first sub-frequency band. One end of the first parasitic element is connected to the ground plane, and another end thereof is an open end, and the first parasitic element and the third radiation element are spaced by a coupling spacing to provide a fourth resonance path operated in a second sub-frequency band.

In an embodiment of the disclosure, a length of the first resonance path is an integer multiple of a ¼ wavelength of the lowest frequency of the first frequency band, a length of the second resonance path is an integer multiple of a ¼ wavelength of the lowest frequency of the second frequency band, a length of the third resonance path is an integer multiple of a ¼ wavelength of the lowest frequency of the first sub-frequency band, and a length of the fourth resonance path is an integer multiple of a ¼ wavelength of the lowest frequency of the second sub-frequency band.

In an embodiment of the disclosure, the antenna structure further includes a second parasitic element, where one end of the second parasitic element is coupled to the ground plane, and another end thereof is an open end, and the open end of the second parasitic element is located adjacent to the open end of the first radiation element to provide a fifth resonance path operated in a third sub-frequency band.

In an embodiment of the disclosure, a length of the fifth resonance path is between a ⅓ wavelength to a ⅕ wavelength of the lowest frequency of the third sub-frequency band.

In an embodiment of the disclosure, the antenna structure is adapted to a mobile device, and the mobile device includes a first body, a second body and a pivot structure. The first body includes a metal casing, a carrying element and a plastic border. The antenna structure is formed on the carrying element, and the metal casing and the plastic border are stacked on each other to form the first body. The first body and the second body are rotated relative to each other through the pivot structure, the antenna structure is disposed in the first body and connected to the pivot structure, and the ground plane includes the pivot structure. The pivot structure includes a metal stand and a metal rotation shaft. The metal stand is fixed to the first body. The metal rotation shaft is connected to the metal stand, and the first body is rotated relative to the second body through rotation of the metal stand relative to the metal rotation shaft.

Based on the above description, in the embodiment of the disclosure, the antenna structure is placed next to the pivot structure of the mobile device, and the parasitic element is placed next to a high-frequency radiation element extending from the feeding element, so as to resonate with the high-frequency radiation element to generate a resonant mode for compensating the lack of a high-frequency bandwidth. In this way, the antenna efficiency is effectively improved without destructing the appearance of the mobile device.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
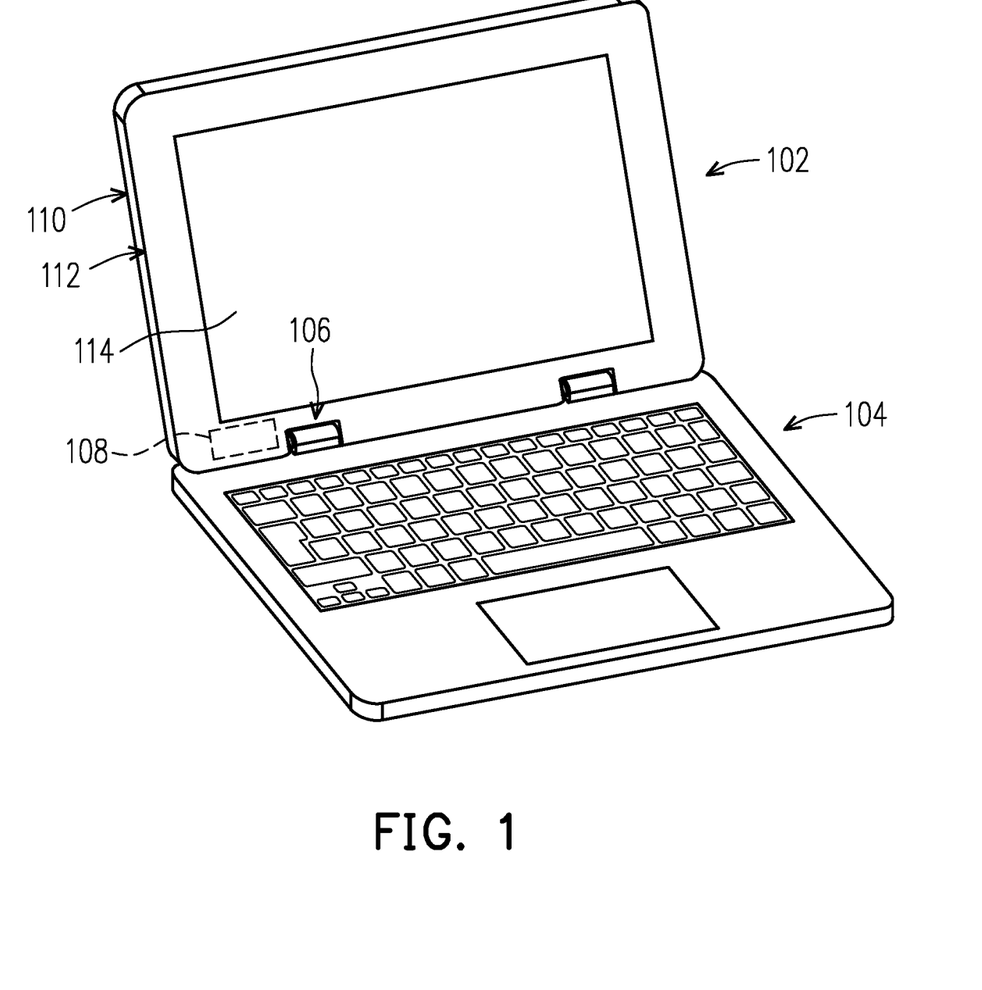
FIG. 1 is a schematic diagram of a mobile device according to an embodiment of the disclosure.

FIG. 1 is a schematic diagram of a mobile device according to an embodiment of the disclosure. The mobile device includes a first body 102, a second body 104, a pivot structure 106 and an antenna structure 108. The pivot structure 106 is connected between the first body 102 and the second body 104, and the first body 102 and the second body 104 may be rotated relative to each other through the pivot structure 106. The first body 102, for example, includes a metal casing 110 and a plastic border 112, where the plastic border 112 surrounds a display panel 114 of the mobile device. The metal casing 110 and the plastic border 112 are stacked on each other to form the first body 102 of the mobile device. Moreover, the antenna structure 108 is disposed in the first body 102, and is located adjacent to the pivot structure 106.

Figure 2:
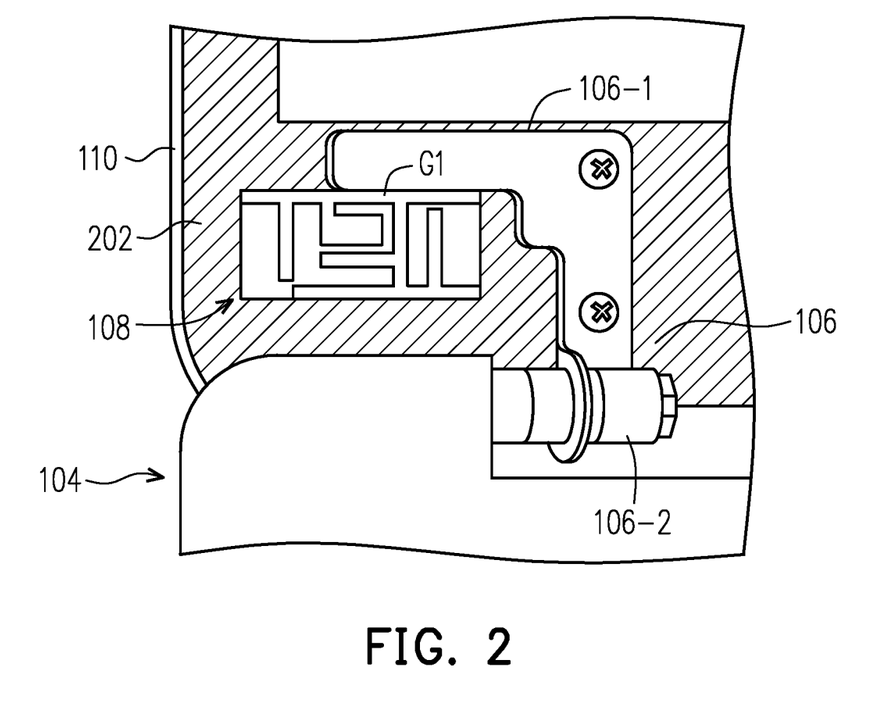
FIG. 2 is a schematic diagram of an antenna structure and a pivot structure according to an embodiment of the disclosure.

Further, configuration of the antenna structure 108 and the pivot structure 106 is shown in FIG. 2. In the embodiment of FIG. 2, the antenna structure 108 is disposed in a border region 202 that is located at a lower part of the first body 102 and not used for displaying, so that the requirement of the slim border design on the left, right and top borders of the display screen is not influenced. The pivot structure 106 includes a metal stand 106-1 and a metal rotation shaft 106-2, and the first body 102 is adapted to be rotated relative to the second body 104 through rotation of the metal stand 106-1 relative to the metal rotation shaft 106-2. The metal stand 106-1 is fixed to the first body 102 (for example, the metal casing 110 of the first body 102), and is connected to a ground plane G1 of the antenna structure 108, and the metal rotation shaft 106-2 is connected to the metal stand 106-1, so that the metal stand 106-1 and the metal rotation shaft 106-2 may be regarded as an extension of the ground plane G1 of the antenna structure 108. The antenna structure 108 and the metal stand 106-1 are, for example, connected by attaching metal foils, though the disclosure is not limited thereto.

Figure 3:
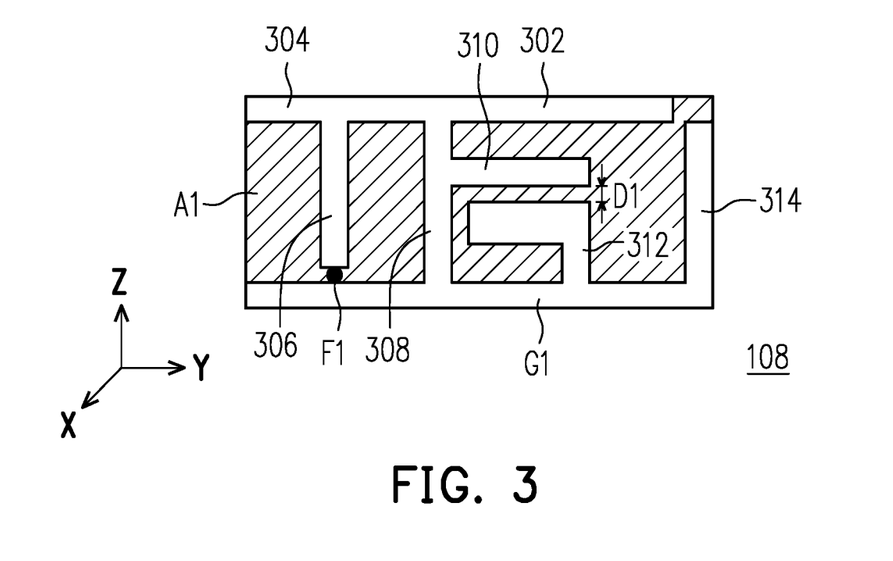
FIG. 3 is a schematic diagram of the antenna structure of the embodiment of FIG. 2.
Figure 4:
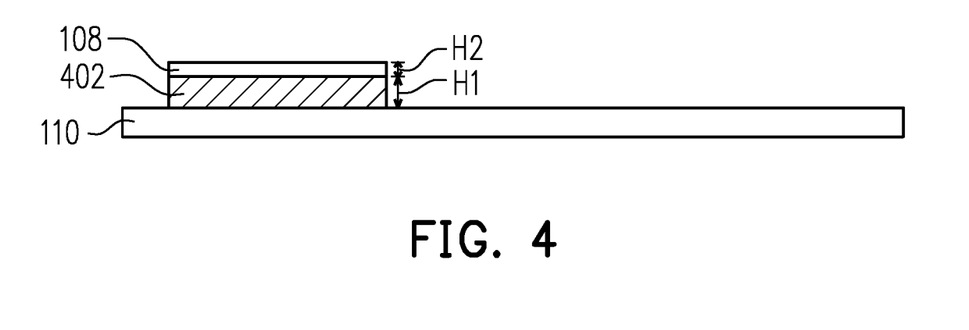
FIG. 4 is a configuration schematic diagram of an antenna structure according to an embodiment of the disclosure.

In detail, the antenna structure 108 is shown as FIG. 3, and an overall size thereof is 25 mm long and 10 mm wide, which includes a planar inverted F antenna, a first parasitic element 312 and a second parasitic element 314. The planar inverted F antenna and the first parasitic element 312 and the second parasitic element 314 are, for example, implemented by an antenna pattern formed on an insulation substrate A1, for example, implemented by a printed circuit board. Moreover, as shown in FIG. 4, the first body 102 may further include a carrying element 402, and the antenna structure 108 may be formed on the carrying element 402, where a thickness H1 of the carrying element 402 is, for example, 2.9 mm, and a thickness H2 of the antenna structure 108 is, for example, 0.4 mm, such that an overall height of the antenna is only 3.3 mm, which avails thinning of the first body 102.

The planar inverted F antenna includes a first radiation element 302, a second radiation element 304, a feeding element 306, a ground element 308 and a third radiation element 310. The second radiation element 304 and the first radiation element 302 extend toward opposite directions. One end of the feeding element 306 is coupled to a junction of the first radiation element 302 and the second radiation element 304, and another end of the feeding element 306 has a feeding point F1. The ground element 308 is connected to the first radiation element 302 and the ground plane G1, the third radiation element 310 and the first radiation element 302 are disposed in parallel, and one end of the third radiation element 310 is connected to the ground element 308, and another end thereof is an open end.

The feeding element 306 may receive a feeding signal through the feeding point F1 to generate a resonant mode covering a first frequency band and a second frequency band, where the first frequency band is, for example, a frequency band near 2.4 GHz, and the second frequency band is, for example, a frequency band near 5 GHz. The resonant mode of the first frequency band may be generated through a first resonance path extending from the feeding point F1 to an open end of the first radiation element 302, and the resonant mode of the second frequency band may be generated through a second resonance path extending from the feeding point F1 to an open end of the second radiation element 304. Moreover, the third radiation element 310 may provide a third resonance path operated in a first sub-frequency band, where the first sub-frequency band is used for compensating the lack of bandwidth of the second radiation element 304. A length of the first resonance path is an integer multiple of a ¼ wavelength of the lowest frequency of the first frequency band, a length of the second resonance path is an integer multiple of a ¼ wavelength of the lowest frequency of the second frequency band, and a length of the third resonance path is an integer multiple of a ¼ wavelength of the lowest frequency of the first sub-frequency band.

Moreover, one end of the first parasitic element 312 is connected to the ground plane G1, and another end thereof is an open end, and the first parasitic element 312 and the third radiation element 310 are spaced by a coupling spacing D1 to resonate with the third radiation element 310 to provide a fourth resonance path operated in a second sub-frequency band, where the second sub-frequency band is also used for compensating the lack of bandwidth of the second radiation element 304, and a length of the fourth resonance path is an integer multiple of a ¼ wavelength of the lowest frequency of the second sub-frequency band. In detail, in the embodiment, the first parasitic element 312 has an L-shape structure formed by a first section and a second section, though the disclosure is not limited thereto. One end of the first section is connected to the ground plane G1, and another end is connected to one end of the second section, and another end of the second section is an open end. The second section is disposed in parallel with the third radiation element 310, and is spaced by a coupling spacing D1 with the third radiation element 310 to resonant with the third radiation element 310.

Moreover, the second parasitic element 314 also has an open end extended from the ground plane G1 and located adjacent to the open end of the first radiation element 302, so as to provide a fifth resonance path operated in a third sub-frequency band, where a length of the fifth resonance path is between a ⅓ wavelength to a ⅕ wavelength of the lowest frequency of the third sub-frequency band. Besides that the second parasitic element 314 is used for resonating with the first radiation element 302 to generate the resonant mode of the second sub-frequency band to compensate the lack of bandwidth of the second radiation element 304, it may further adjust impedance matching of the antenna structure 108 under the first frequency band to improve the antenna efficiency.

Figure 5:
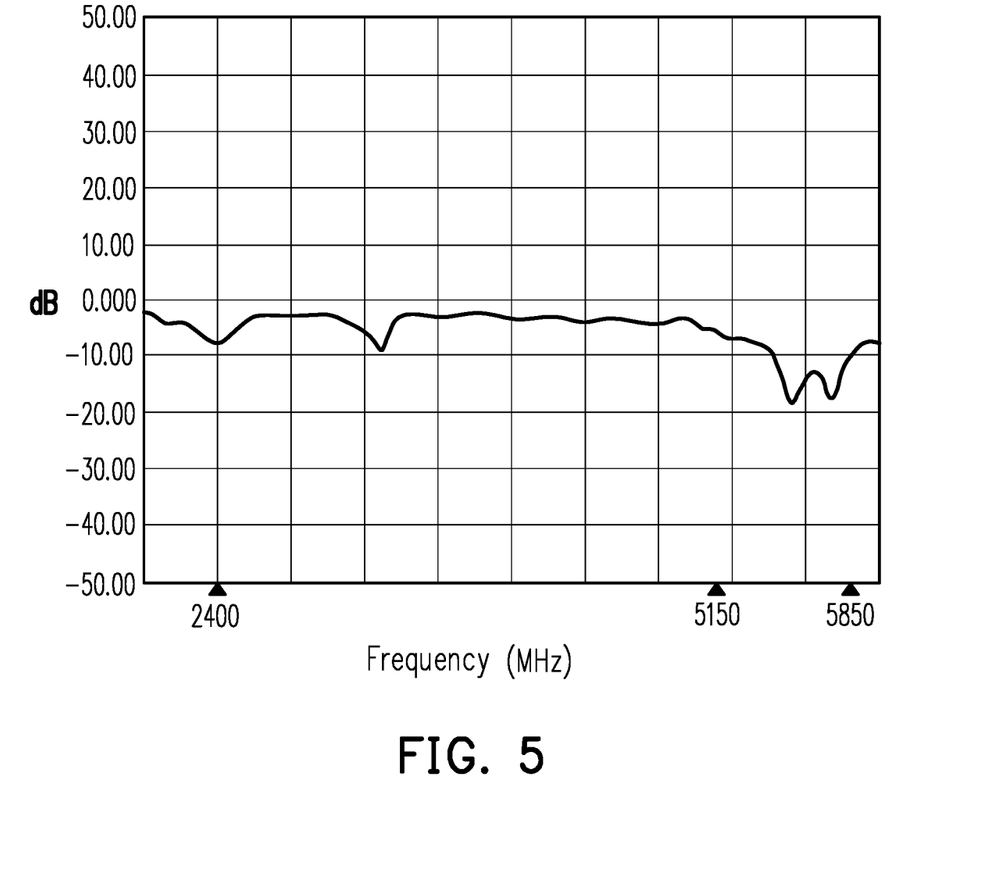
FIG. 5 is a diagram of a return loss of the antenna structure of the embodiment of FIG. 2.
Figure 6:
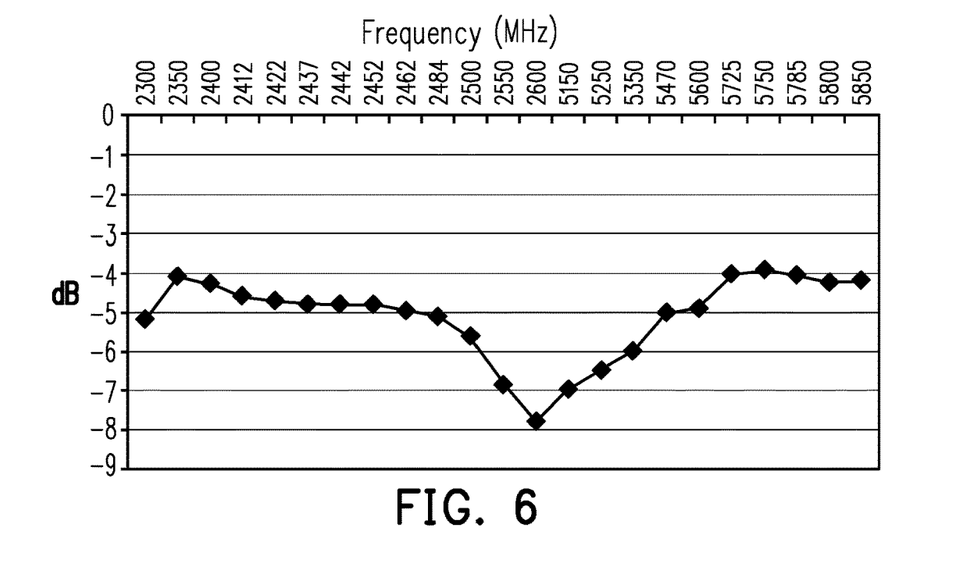
FIG. 6 is a diagram of efficiency of the antenna structure of the embodiment of FIG. 2.

FIG. 5 is a diagram of a return loss of the antenna structure of the embodiment of FIG. 2. FIG. 6 is a diagram of efficiency of the antenna structure of the embodiment of FIG. 2. As shown in FIG. 5 and FIG. 6, the antenna structure 108 of the embodiment of FIG. 2 generates the resonant mode near both of 2.4 GHz and 5 GHz, and nearly reaches the efficiency of −6 dB. Therefore, the above first parasitic element 312 and the second parasitic element 314 may indeed effectively compensate the lack of high-frequency bandwidth.

Figure 7:
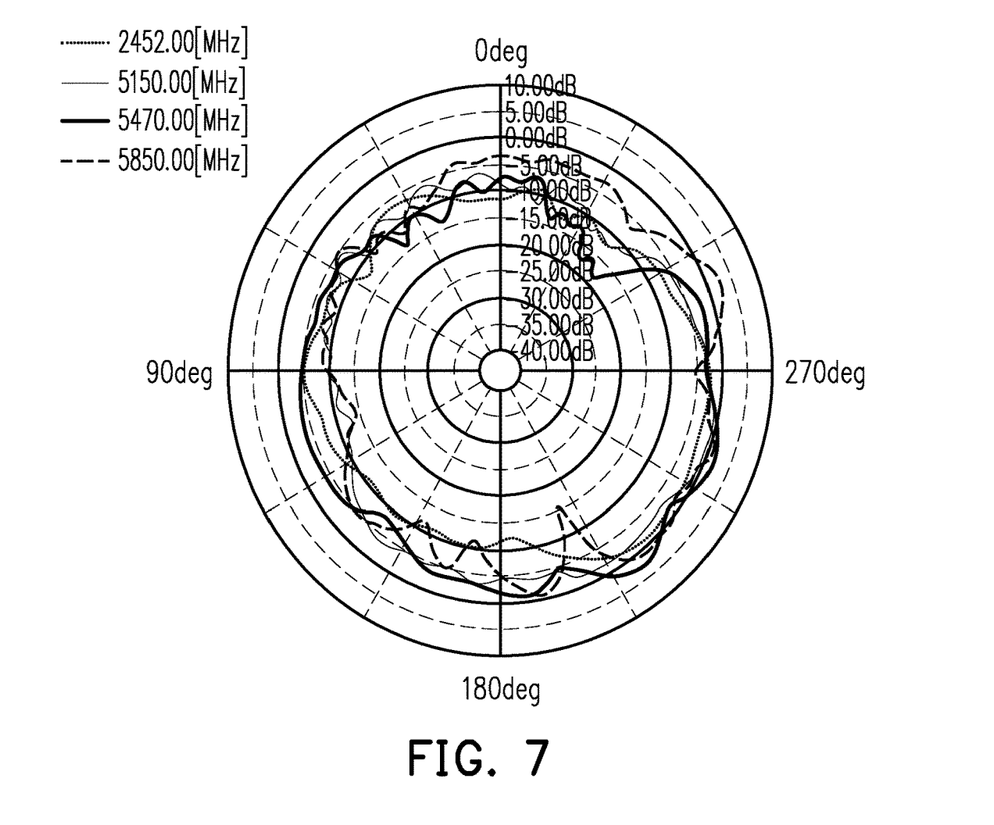
FIG. 7 is a diagram of a planar radiation pattern of the antenna structure of the embodiment of FIG. 2 at 2.4 GHz and 5 GHz.

Moreover, since the metal stand 106-1 and the metal rotation shaft 106-2 of the pivot structure 106 of the embodiment of FIG. 2 may extend the ground plane G1 of the antenna structure 108 toward a direction away from the metal casing 110, it helps to maintain a good radiation pattern of the antenna structure 108. FIG. 7 is a diagram of a planar radiation pattern of the antenna structure of the embodiment of FIG. 2 at 2.4 GHz and 5 GHz. As shown in FIG. 7, the radiation pattern of the antenna structure 108 at 2.4 GHz and 5 GHz in an X-Y plane has none obvious null point, and a good radiation pattern is maintained even in a direction of 180 degrees (i.e. a direction of the side of the metal casing 110 of the first body 102). Although the radiation pattern in 270 degrees is relatively weak, the radiation pattern may be compensated by placing left-right symmetric antenna structures on the mobile device.

In summary, in the embodiment of the disclosure, the antenna structure is placed next to the pivot structure of the mobile device, and the parasitic element is placed next to a high-frequency radiation element extending from the feeding element, so as to resonate with the high-frequency radiation element to generate a resonant mode for compensating the lack of a high-frequency bandwidth. In this way, the antenna efficiency is effectively improved without destructing the appearance of the mobile device. In some embodiments, the pivot structure may extend the ground plane toward the direction away from the metal casing, such that the antenna structure has good radiation pattern.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. A mobile device, comprising:
 a first body;
 a second body;
 a pivot structure, wherein the first body and the second body are rotated relative to each other through the pivot structure; and
 an antenna structure, disposed in the first body, and the antenna structure comprising:
  a planar inverted F antenna, comprising:

a first radiation element;

a second radiation element, the second radiation element and the first radiation element extending toward opposite directions;

a feeding element, having one end coupled to a junction of the first radiation element and the second radiation element, and another end having a feeding point, wherein the feeding point is configured to receive a feeding signal, the feeding element is operated in a first frequency band through a first resonance path extending from the feeding point to an open end of the first radiation element, and is operated in a second frequency band through a second resonance path extending from the feeding point to an open end of the second radiation element;

a ground element, connected to the first radiation element and a ground plane; and a third radiation element, having one end connected to the ground element, and another end being an open end, wherein the third radiation element and the first radiation element are disposed in parallel to provide a third resonance path operated in a first sub-frequency band; and a first parasitic element, having one end connected to the ground plane, and another end being an open end, wherein the first parasitic element and the third radiation element are spaced by a coupling spacing to provide a fourth resonance path operated in a second sub-frequency band.

2. The mobile device as claimed in claim 1, wherein the antenna structure further comprises:

a second parasitic element, having one end coupled to the ground plane, and another end being an open end, wherein the open end of the second parasitic element is located adjacent to the open end of the first radiation element to provide a fifth resonance path operated in a third sub-frequency band.

3. The mobile device as claimed in claim 2, wherein a length of the fifth resonance path is between a ⅓ wavelength to a ⅕ wavelength of the lowest frequency of the third sub-frequency band.

4. The mobile device as claimed in claim 1, wherein a length of the first resonance path is an integer multiple of a ¼ wavelength of the lowest frequency of the first frequency band, a length of the second resonance path is an integer multiple of a ¼ wavelength of the lowest frequency of the second frequency band, a length of the third resonance path is an integer multiple of a ¼ wavelength of the lowest frequency of the first sub-frequency band, and a length of the fourth resonance path is an integer multiple of a ¼ wavelength of the lowest frequency of the second sub-frequency band.

5. The mobile device as claimed in claim 1, wherein the ground plane comprises the pivot structure.

6. The mobile device as claimed in claim 5, wherein the pivot structure comprises:

a metal stand, fixed to the first body, and connected to the antenna structure; and a metal rotation shaft, connected to the metal stand, wherein the first body is rotated relative to the second body through rotation of the metal stand relative to the metal rotation shaft.

7. The mobile device as claimed in claim 1, wherein the first body comprises a metal casing, a carrying element and a plastic border, the antenna structure is formed on the carrying element, and the metal casing and the plastic border are stacked on each other to form the first body.

8. An antenna structure, comprising:

a planar inverted F antenna; comprising:

a first radiation element;

a second radiation element, the second radiation element and the first radiation element extending toward opposite directions;

a feeding element, having one end coupled to a junction of the first radiation element and the second radiation element, and another end having a feeding point, wherein the feeding point is configured to receive a feeding signal, the feeding element is operated in a first frequency band through a first resonance path extending from the feeding point to an open end of the first radiation element, and is operated in a second frequency band through a second resonance path extending from the feeding point to an open end of the second radiation element a ground element, connected to the first radiation element and a ground plane; and a third radiation element, having one end connected to the ground element, and another end being an open end, wherein the third radiation element and the first radiation element are disposed in parallel to provide a third resonance path operated in a first sub-frequency band; and a first parasitic element, having one end connected to the ground plane, and another end being an open end, wherein the first parasitic element and the third radiation element are spaced by a coupling spacing to provide a fourth resonance path operated in a second sub-frequency band.

9. The antenna structure as claimed in claim 8, wherein a length of the first resonance path is an integer multiple of a ¼ wavelength of the lowest frequency of the first frequency band, a length of the second resonance path is an integer multiple of a ¼ wavelength of the lowest frequency of the second frequency band, a length of the third resonance path is an integer multiple of a ¼ wavelength of the lowest frequency of the first sub-frequency band, and a length of the fourth resonance path is an integer multiple of a ¼ wavelength of the lowest frequency of the second sub-frequency band.

10. The antenna structure as claimed in claim 8, further comprising:

a second parasitic element, having one end coupled to the ground plane, and another end being an open end, wherein the open end of the second parasitic element is located adjacent to the open end of the first radiation element to provide a fifth resonance path operated in a third sub-frequency band.

11. The antenna structure as claimed in claim 10, wherein a length of the fifth resonance path is between a ⅓ wavelength to a ⅕ wavelength of the lowest frequency of the third sub-frequency band.

12. The antenna structure as claimed in claim 8, wherein the antenna structure is adapted to a mobile device, and the mobile device comprises a first body, comprising a metal casing, a carrying element and a plastic border, wherein the antenna structure is formed on the carrying element, and the metal casing and the plastic border are stacked on each other to form the first body;

a second body; and a pivot structure, wherein the first body and the second body are rotated relative to each other through the pivot structure, the antenna structure is disposed in the first body and connected to the pivot structure, the ground plane comprises the pivot structure, and the pivot structure comprises:

a metal stand, fixed to the first body; and a metal rotation shaft, connected to the metal stand, and the first body being rotated relative to the second body through rotation of the metal stand relative to the metal rotation shaft.

* * * * *